Nov. 24, 1936.  A. PAILLARD  2,061,879
INTERMITTENT FILM FEED APPARATUS
Filed Aug. 6, 1934
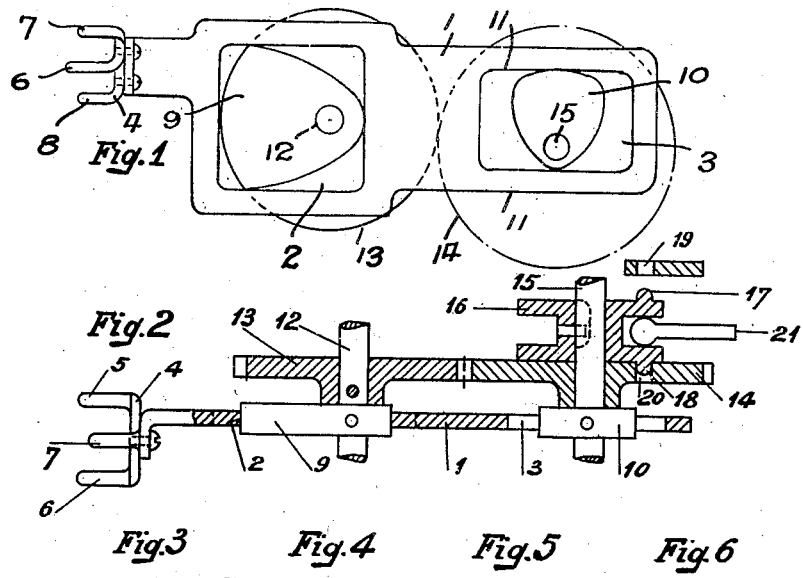
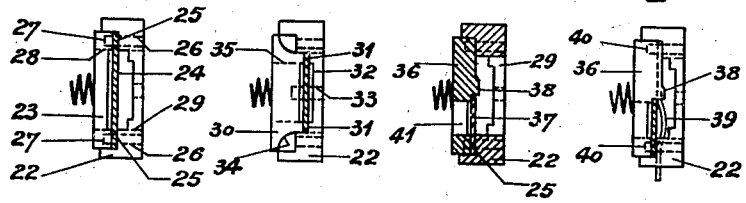
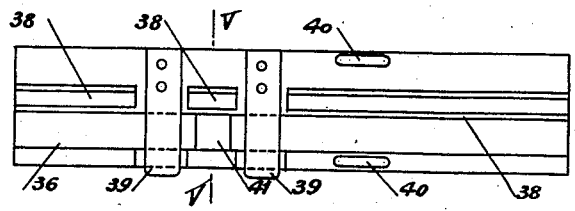
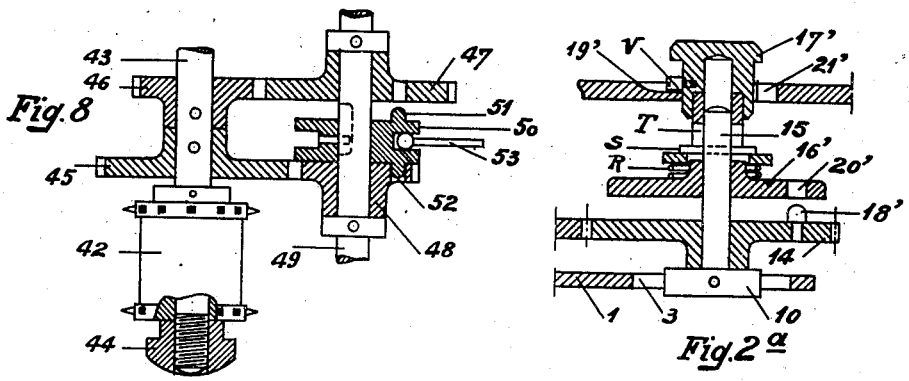

Patented Nov. 24, 1936

2,061,879

UNITED STATES PATENT OFFICE 2,061,879

INTERMITTENT FILM FEED APPARATUS

Albert Paillard, Sainte-Croix, Switzerland

Application August 6, 1934, Serial No. 738,697
In Switzerland August 29, 1933

4 Claims. (Cl. 88—18.4)

The present invention has for object an arrangement for a cinematographic apparatus for the projection of films of different widths and different gauges, the carrying along of the film being effected by staggered movements and by means of a multiple claw secured fast on a claw carrier.

The arrangement according to the invention is characterized by the fact that the claw carrier has a variable working path according to the nature of the film to be carried along, in combination with a stationary gate, shaped in such a manner as to be able to guide films of different widths owing to the fact that said gate is combined with several interchangeable pressure shutters each one provided for a specific film, certain of the said shutters possessing appropriate means for the partial guiding of the film in width.

The accompanying drawing shows, by way of example, a form of construction of the invention arranged for an apparatus adapted to project three films of different width and gauge namely the 16 mm. film provided with a row of perforations on each of its two edges, the film of 9,5 mm. provided with a central row of perforations and the film of 8 mm. perforated along one of its edges only, this latter film being generally obtained by cutting lengthwise axially a film of 16 mm.

Figs. 1 and 2 are a lateral view and a plan view partly in axial section of the mechanism permitting of varying the working path of the driving claw.

Fig. 2a shows another form of execution of the coupling device;

Fig. 3 is an end view of the stationary gate with the pressure shutter used for the projection of the 16 mm. film.

Fig. 4 is an end view of the stationary gate with the pressure shutter used for the projection of a 9,5 mm. film.

Figs. 5 and 6 are a cross section and an end view of the stationary gate with the pressure shutter used for projection of the 8 mm. film.

Fig. 7 is a view of the pressure shutter shown in Figs. 5 and 6, the section of Fig. 5 passing through V—V of the said Fig. 7.

Fig. 8 is a view partly in axial section of a delivery mechanism for the film and with variable speed.

In the example shown, the claw carrier 1 consists of a plate comprising apertures, one being square, marked 2, and the other marked 3 being rectangular. It carries, held fast, the claw 4 provided with four teeth: two lateral teeth 5 and 6 and two superposed central teeth 7 and 8. The teeth 5 and 6 are a little longer than the teeth 7 and 8 and are intended to penetrate, either simultaneously in the two lateral perforations of the 16 mm. film, or one of them only, for example the tooth 6, in the single lateral perforation of the 8 mm. film. The teeth 8 and 7 are provided to engage the central perforation of the 9,5 mm. film.

Inside the windows or apertures 2 and 3 move two cams 9 and 10, the cam 9 having such a shape that it turns without play in the aperture 2, and the cam 10 having such a shape that there is never any play between it and the two large faces 11 of the rectangular aperture 3.

The cam 9 is integral with the shaft 12 which itself is integral with a toothed wheel 13 driven by another toothed wheel 14 having the same number of teeth and turning freely on the shaft 15 with which is integral the second cam 10. On the shaft 15 is situated a loose member 16 capable of sliding on this shaft but bound to rotate with it. This loose member comprises two bosses 17 and 18 the first being capable of lodging in an opening 19 of the frame of the apparatus and the second in an opening 20 of the toothed wheel 14. The loose member 16 is controlled in its movement of sliding to and fro by a lever 21 only the end of which has been illustrated.

In the position shown for these various parts, the wheel 14 through the intermediary of the boss 18 is rendered fast with the loose member 16 and so with the shaft 15. The driving of the whole is effected by motive means not shown and acting directly on one of the toothed wheels 13 or 14, it will be seen that not only the wheel 13, therefore the cam 9, will be driven but also, and through the loose member 16, the shaft 15 and the cam 10. The claw holder 1 will therefore make a forward and rearward movement and inversely and a plunging movement of its extremity carrying the claw, resulting from the combination of the action of the two cams 9 and 10 turning at the same speed. The amplitude of the forward and rearward movement and inversely, is unchangeable; it depends solely on the largeness of the square aperture 2 and of the cam which is housed therein.

The working path or travel of the claw or the amplitude of the plunging movement will vary on the contrary according to the combination of movement obtained by the rotation of the one or of both cams 9 and 10.

By displacing the loose member 16 into the position wherein its boss 17 is rendered immovable in the hole 19, the cam 10 is made fast which then serves as the centre of rotation for the claw carrier 1 which the wheel 14 turning then freely on the shaft 15, drives through the intermediary of the wheel 13 and the cam 9.

According to Fig. 2a, which represents another form of embodiment of the coupling device, on the shaft 15 is placed the loose member 16' capable of sliding on this shaft but bound to rotate with it. The toothed wheel 14 comprises a boss 18' capable of lodging in an opening 20' of the sliding plate 16'. The latter can be moved on the shaft 15 by means of a button 17' comprising a screw V.

In the shown position of the different elements, the boss 18' of the toothed wheel 14 is disengaged from the opening 20' of the sliding plate 16'. The latter is held in this position by means of the said screw V engaged into the recess 19' of the housing of the apparatus. It results thereof that the cam 10 fixed on the shaft 15 is immobilized in a determined position. The cam 10 forms the centre of oscillation of the claw carrier 1 which the wheel 14, turning at this moment loosely on shaft 15, drives by intermediary of the wheel 13 and the cam 9.

By a rotation of the button 17', which is integral with the sliding plate 16', it is possible to bring the screw V opposite to the opening 21' which allows then the passage of said screw V. By the action of the spring R, the plate 16' is now displaced towards the wheel 14. By the introduction of the boss 18' into the opening 20', the wheel 14 is rendered integral with the shaft 15 by intermediary of the sliding plate 16'. It results therefrom that not only the wheel 13, i. e. the cam 9 will be made rotate, but also and by intermediary of the plate 16', the shaft 15 and the cam 10.

The claw carrier 1 will make thus a to and fro movement and inversely and produce a plunging movement on its extremity carrying the claws, resulting from the combination of the action of the two cams 9 and 10 turning at the same speed. The amplitude of the forward and rearward movement and inversely, is invariable; it depends solely on the largeness of the square aperture 2 and of the cam which is housed therein; this will be described hereabout in more detail with respect to the common driving of the organs 21 and 53, which could also be applied to the button 17' and to the lever 53.

The various parts described will be proportioned in such a manner that the cam 10 being made fast in the position shown in the drawing, the plunging movement of the claw shall be such as to correspond with the travel of the film which has the largest gauge, that of 16 mm. whereas, the cam 10 being engaged through the intermediary of the loose members 16 or 16', this plunging movement will be reduced to the height of the picture of the narrowest film, that of 8 mm. There will thus be two different amplitudes, nevertheless usable for the three films, given that the amplitude corresponding to the intermediate film of 9,5 mm. is approximately similar to the amplitude corresponding to the large film, the slight difference existing being also compensated, at least sufficiently for the practical purposes, by the difference of the acting radius of the teeth 5, 6 on the one hand and the teeth 7, 8 on the other hand, the amplitude of the plunging movement of the latter being for this reason slightly less than the amplitude of the plunging movement of the former.

By simple displacement of an operating device for the lever 21 or of the button 17' it is possible to adjust the driving mechanism, Figs. 1, 2 and 2a for driving one or other of the three films under review.

These films will be guided in a stationary gate 5 shown in end view and marked 22 in Figs. 3 to 6, Figure 5 nevertheless showing a section.

Fig. 3 shows how this gate can cooperate with a shutter 23 for the projection of the film 24 of 16 mm. For this purpose the film bears on two preliminary shoulders 25 of the gate against which it is held by the fact that the shutter 23 presses on it under the action of springs.

The gate comprises two openings 26 for the passage of the teeth 5 and 6 adapted to carry along the film and the shutter 23 has corresponding milled surfaces 27 to permit of the passage of the extremity of said teeth.

Shutter 23 and gate 22 further comprise each one an aperture 28 respectively 29 corresponding, the former to the frame of the picture to be projected, the latter to the width of this frame while nevertheless being greater in height. This permits of focussing the picture by simply displacing longitudinally the shutter 23.

To go from the 16 mm. film to a 9,5 mm. film it only needs the removal of the shutter 23 and the replacement thereof by the shutter 30 shown in Fig. 4, the film then bearing or resting against a second pair of shoulders 31 of the stationary gate 22. This film, shown at 32, is provided with a central perforation in which engage the teeth 7 and 8 by passing through the opening 33 of the stationary gate. Since the claw 4 acts from the right, as shown in the drawing, it will be seen that this film is closer than the former one so that the shorter teeth will reach it while the others will displace themselves without meeting any obstacle in their passage since the apertures in the gate and the recessed portion 34 of the shutter 30 provide therefor.

Similarly in the previous example of Fig. 3, the extremity of the teeth 5, 6 reach the film 24, the teeth 7, 8 which are short ones, move in front of the film without touching it.

The framing of the picture is determined in this case by the aperture 35 of the shutter 30, which is likewise adjustable longitudinally.

For projecting the film of 8 mm. a third shutter is made use of, marked 26, and shown in front elevation at Fig. 7, in section at Fig. 5 and in end view at Fig. 6.

The film 37 bears in this case on one side only, that is the side where the perforations are provided, on one of the shoulders 25 of the gate and is guided on its width at the other side by a boss 38 of the shutter 36. In order that it may bear correctly against this shutter that is to say that it remains flat, two springs 39 are also riveted to said shutter. The film will be carried along only by the tooth 6, the teeth 5, 7, and 8 moving without encountering any obstacles in their travel because these teeth 7 and 8 do not meet the shutter and the extremity of the teeth 5 and 6 can move in the milled surfaces 40 of this latter. The opening 41 of the shutter 36 which is adapted to slide longitudinally, surrounds the picture, which is not exactly in the optical axis which however is of no importance in practice.

The rapidity of translation of the films varying with the amplitude of the plunging movement of the claw, it is obvious that the regular delivery or driving member for the film must be capable of being modified in speed accordingly. In as much as it would in practice be complicated to provide interchangeable delivery spools of different diameters it is preferable to retain the same diameter of spool and to vary the speed as shown in Fig. 8.

At 42 is arranged a spool secured on a shaft 43 by means of a nut 44, this shaft carrying two toothed wheels 45, 46 of different diameter capable of being driven, the one by the wheel 47 and the other by the wheel 48 of corresponding diameter, both disposed on the shaft 49 which itself is driven by the driving mechanism which is not illustrated. While the wheels 45, 46 are fast on the shaft 43, the wheels 47, 48 turn loose on the shaft 49 which latter carries a loose member 50 which is capable of sliding thereon but forced to rotate therewith, said loose member comprising bosses 51, 52 adapted to penetrate into a corresponding opening either of the one or the other of the two wheels 47, 48. A lever, the extremity 53 of which is visible in the drawing, determines the position of the loose member of this mechanism which is nothing more than a change speed device with two speeds. One of the speeds, that corresponding to the position of the parts as shown in the drawing, serves for driving the smallest films, those of 8 mm. whereas the other speed is adapted to drive the films of 16 and 9,5 mm.

It is obvious that the levers 21 and 53 or the button 17' and the lever 53 can be interconnected in such a manner that from the exterior of the apparatus for projecting and by a single operation, both the loose members 16 or 16' and the loose member 50 are placed in the position corresponding to the projection of the particular film, simultaneously.

The operations carried out to pass from one film to another will consist therefore solely in placing, by means of the single control, the lever 21 or the button 17' and the lever 53 in the desired position, in bringing into position in the stationary gate 22 the one of the three shutters 23, 30 or 36 which corresponds with said film and finally in placing the corresponding driving member in position.

It is obvious that the widths of film indicated and the number of films capable of being projected are only given by way of example and that it is possible to provide similar arrangements for more than three films and for other widths and gauges.

I claim:—

1. In an intermittent film feed apparatus, a film gate provided with a film travel passage for accommodating films of different widths, a claw carrier, a multiple claw thereon all prongs of which are movable through said gate, shutter means engageable with film in the confines of said gate, claw carrier actuator means including cams operable on said carrier at a plurality of points, and means for arresting movement of one cam while another operates the carrier whereby to vary the actuation of said claw carrier.

2. In an intermittent film feed apparatus, a film drive comprising separate claw means adapted for operative engagement with films of different widths, a carrier therefor including a frame movably mounted on the apparatus and having a plurality of differently sized cam-ways therein, cams operable in said cam-ways, means for operating said cams in unison, and means for locking one cam against movement while the other cam continues to operate.

3. In an intermittent film feed apparatus, a film drive comprising separate claw means adapted for operative engagement with films of different widths, a carrier therefor including a frame movably mounted on the apparatus and having a pair of cam-ways therein, cams rotatable in said ways, and adjustable means for holding one of said cams against rotation to provide a fixed pivot for the frame while the other cam continues to operate the frame.

4. In an intermittent film feed apparatus, a film drive including a shuttle arm provided with a pair of differently sized cam-ways, a driving shaft, a cam fixed thereto and rotatable in one of said ways, a gear wheel fixed to said shaft, a driven shaft, a cam fixed to said driven shaft and rotatable in the other of said ways, a second gear wheel meshed with said first mentioned gear wheel and loosely rotatable on said driven shaft, and a clutch means for engaging said second gear wheel in driving relation with said driven shaft.

ALBERT PAILLARD.